United States Patent [19]

McNeff

[11] 4,182,755

[45] Jan. 8, 1980

[54] FEED INTAKE CONTROL OF ANIMALS

[75] Inventor: Larry C. McNeff, Wayzata, Minn.

[73] Assignee: Cargill Inc., Minneapolis, Minn.

[21] Appl. No.: 663,437

[22] Filed: Mar. 3, 1976

Related U.S. Application Data

[63] Continuation-in-part of Ser. No. 532,741, Dec. 18, 1974, abandoned, which is a continuation-in-part of Ser. No. 430,676, Jan. 4, 1974, abandoned.

[51] Int. Cl.$^2$ .................... A61K 33/26; A61K 33/14; A61K 33/06
[52] U.S. Cl. .................................. 424/147; 424/153; 424/154; 424/166
[58] Field of Search ............... 424/153, 147, 154, 166

[56] References Cited

U.S. PATENT DOCUMENTS

| | | | |
|---|---|---|---|
| 3,461,203 | 8/1969 | Ringarp et al. | 424/153 |
| 3,523,798 | 8/1970 | Kail | 71/29 |
| 3,962,484 | 6/1976 | Grosso et al. | 426/658 |

OTHER PUBLICATIONS

Loew–Chem. Abst., vol. 17 (1923), p. 2757$^3$.
Loew–Chem. Abst., vol. 26 (1932), p. 1642$^3$.
Stockklausner et al.–Chem. Abst., vol. 27 (1933), p. 5788$^6$.
Bushman et al.–Chem. Abst., vol. 67 (1967), p. 114715a.
Crookshank et al.–J. Animal Science, vol. 36, No. 6 (1973), pp. 1007–1009.
Ely et al., Chem. Abstr., vol. 77 (1972), p. 99996d.

*Primary Examiner*—Sam Rosen
*Attorney, Agent, or Firm*—Fitch, Even & Tabin

[57] ABSTRACT

Feed compositions for self-feeding animals including a chloride ion intake control agent. The chloride ion is provided from a salt selected from calcium chloride, ammonium chloride, aluminum chloride, ferric chloride, magnesium chloride and mixtures thereof.

20 Claims, No Drawings

FEED INTAKE CONTROL OF ANIMALS

The present application is a Continuation-in-part of patent application Ser. No. 532,741, filed Dec. 18, 1974 which is a Continuation-in-part of patent application Ser. No. 430,676, filed Jan. 4, 1974, both now abandoned.

The present invention relates generally to feed compositions for domestic animals and poultry and to a method for controlling the feed intake of animals and poultry. More particularly, the present invention is directed to feed compositions which permit controlled feed intake of self-fed domestic animals and poultry and to a method for controlling the feed intake of domestic animals and poultry when feed is offered to the animal on a free choice basis.

It is often desirable to offer feed to animals on a free choice basis without periodic feedings of a rationed amount each day. A disadvantage of feeding animals on a free choice basis is that most animals, particularly swine, cattle, horses, poultry and domestic pets tend to over-eat and consequently take in a higher level of feed than is necessary for desired weight gain or weight maintenance. This results in the provision of unnecessary amounts of feed which is an additional expense and is often detrimental to the health of the animals. It is desirable to limit the intake of the feed when the animal is offered the feed on a free choice basis.

It is known to incorporate high levels of salt (sodium chloride) or gypsum (calcium sulfate) in the feed so as to limit intake of the feed when the feed is provided to the animal on a free choice basis. However, it is often detrimental to the health of the animal to ingest such high levels of sodium chloride or calcium sulfate. Also, certain animals refuse to eat any feed at all when high levels of various salts are present in the feed.

Domestic swine are particularly voracious feeders. When permitted free access to a food supply it is difficult to control the feed intake of swine and, accordingly, swine are particularly subject to excessive feed consumption. The principal effects of such overeating are downgrading of carcass quality of market swine and increased feed cost for breeding stock. The problem of excessive feeding for pregnant females, generally referred to as "gilts", if pregnant for the first time; or "sows", if pregnant for the second or more times, is particularly serious. Hereinafter the term "sows" will be used to describe pregnant females although it will be understood that sows and gilts are differentiated according to the number of pregnancies.

In general, the nutritive requirements during pregnancy are only slightly greater than the requirements for maintenance of weight. However, sows which are maintained on a self-feeding diet normally consume two and a half to three times their needs for optimum reproductive performance. This leads to excessive feed cost per pig born alive and per pig weaned. Also, sows that become too fat do not handle themselves well when the litters are born. As a result, the sows have a tendency to lie on and kill some of the pigs. Further, pigs born to sows with an excess weight condition are believed to be less vigorous and have a higher mortality rate. Sows which have an excess weight condition at the time of farrowing eat less feed during lactation than sows which are more sparingly fed during gestation. Accordingly, the litters' nutrient needs are derived to a greater extent from essential body tissue of the sow and less from the diet fed the sow after farrowing. The nutrient depletion of the sow's body that results frequently leads to bone fractures and delayed re-breeding.

Various methods have been proposed or developed to control feed intake and weight gain of sows during pregnancy and many of these methods have been attempted or have been applied to other animals. Among these methods are hand-feeding of limited amounts of feed to animals maintained in groups; hand-feeding of individual animals which have been isolated; self-feeding of diet that contains large amounts of fiber (undigestible material); and self-feeding of a normal diet for a few hours every other day or for several hours every third day. It has also been proposed to add a high level of common salt (sodium chloride) to the diet of sows to prevent excessive feed consumption. (See University of Minnesota, Agricultural Experiment Station Report H-139, by L. E. Hanson, Sept. 1956). However, none of the methods described above have been wholly satisfactory in controlling and limiting the feed consumption of animals.

It would be desirable to provide feed compositions which may be fed to animals and poultry on a free choice basis but which the animal would eat only in an amount required for efficient weight gain or for weight maintenance. As indicated above, it has been proposed to use sodium chloride as an intake control agent in swine feed. However, the use of sodium chloride at levels as high as 10 percent of a swine feed formulation does not result in appreciably reduced feed intake. Moreover, the use of such high levels of sodium chloride results in excessive water consumption by the swine during feeding and may result in tongue lesions.

Accordingly, it is a principal object of the present invention to provide feed compositions for domestic animals and poultry which results in the limiting of intake of the feed composition on a self-fed basis to an amount which is needed for weight gain or weight maintenance without consumption of more than is needed by the animal or fowl.

It is another object of the present invention to provide a feed composition for domestic animals or poultry which is highly effective in limiting feed intake to a desired amount.

It is a further object of the present invention to provide feed compositions for pregnant swine which may be offered to the swine on a self-feeding basis.

These and other objects of the invention will become more apparent from the following detailed description and the accompanying claims.

Generally, in accordance with the present invention, a self-feeding ration for domestic animals and poultry containing a feed intake control agent is provided. For purposes of the present invention, the term "domestic animals" includes all of that group of animals which have been domesticated and which rely upon man for all or a portion of their feed. Included in this group are arteriodactyl animals, such as swine, sheep and cattle; solid hoofed animals, such as horses; and domestic pets, such as dogs and cats. The term includes both monogastric and ruminant animals. By the term "poultry" is meant all domestic fowl, such as chickens, turkeys, ducks, geese and guinea hens. The feed intake control agent is included in the feed ration at a level effective to suppress the intake of the feed ration by the animal or fowl to an amount suitable for desired weight gain or weight maintenance without overeating when the feed ration is offered to the animal on a free choice basis.

It has been discovered that chloride ion is effective to control the feed intake of an animal feed ration when the feed ration is offered to the animal on a free choice basis. It has further been discovered that the effectiveness of chloride ion as feed intake control agent is dependent upon the presence of the chloride ion at a level in the feed ration at least about one percent above the total level of monovalent cations in the feed ration. For purposes of calculation, the term "monovalent cations" refers to all monovalent cations other than ammonium and hydrogen ion which are provided in the feed ration. The principal monovalent cation salts which are frequently used in feed rations are the salts of sodium and potassium.

The feed intake control agent is preferably provided from a chloride salt of a multivalent cation. Particularly preferred chloride salts are selected from the group consisting of calcium chloride, aluminum chloride, ferric chloride, magnesium chloride and mixtures thereof.

It has also been determined that ammonium chloride is effective as a source of chloride ion for use as an intake control agent. The presence of the monovalent ammonium ion does not detract from the effectiveness of the chloride ion. The use of ammonium chloride is an exception to the stated preferred use of chloride salts of multivalent cations. Hydrogen ion is excluded because of the strong pH effect. Hereinafter in the present specification, the term "total level of monovalent cation" is understood to exclude the level of ammonium ion and hydrogen ion present, if any.

The ability of chloride ion in excess of monovalent cations to function as an intake control agent to control the intake of self-fed animals and poultry is totally surprising. Attempts have been made to use high levels of sodium chloride to limit the feed intake of swine and cattle. It has been reported that the use of sodium chloride at a level of 10 percent of the total feed ration was not effective to limit feed intake of swine when the feed was offered to the swine on a free choice basis.

For most domestic animals and poultry, the chloride ion intake control agent of the present invention is preferably used at a level in the range of from about 1 percent to about 6 percent by weight of the feed ratio in excess of the total level of monovalent cation by weight of the feed ration. At the preferred level of chloride ion use of from about 1 to about 6 percent, the feed intake of most domestic animals is reduced by from about 20 percent to about 80 percent when the animals are fed on a free choice basis. For some domestic animals, such as cattle and horses, the intake control agent may be used at higher levels of up to about 12 percent by weight to attain a feed reduction of up to about 80 percent. It should be understood that chloride ion can be used at levels of less than 1 percent in excess of the total level of monovalent cation for some purposes. For example, use of chloride ion in the range of from about 0.25 to about 1.0 percent by weight in excess of the total level of monovalent cation ion is effective in some cases to reduce feed intake by from about 5 to about 20 percent. Such levels of limited feed reduction are desirable for some purposes, such as "finishing" of cattle in feed lots. It should also be understood that the levels of use of the intake control agent refer to the chloride ion level without consideration of the multivalent cation level, ammonium ion level or the water of hydration or equilibrium moisture of the chloride salts.

The reason for the effectiveness of chloride ion as an intake control agent is not known. It is believed that the requirement that the chloride ion be present in excess of the total level of monovalent cations is related to the high solubility of most monovalent cation chloride salts compared to the solubility of most multivalent cation chloride salts. It is believed that the association of chloride ion with a monovalent cation results in providing a salt balance which is capable of being removed from the animal body during normal excretion of wastes. The ammonium ion exception is believed to be due to the ability of most animals to metabolize ammonium ion into the blood stream.

The intake control agent effectively limits the feed consumption of domestic animals and poultry and provides a feed ration which can be administered on a self-feeding basis. As previously indicated, the problem of self-feeding of swine is particularly acute for pregnant female swine and the intake control agents of the present invention are particularly suitable for use in feed rations for pregnant female swine.

It should be understood that the feed formulations of the present invention are balanced diet feed formulations which are suitable for providing a complete feed ration for domestic animals and poultry. The levels of use of the intake control agent of the invention are based on the total weight of the components of such balanced diet feed formulations on a dry solids basis. However, the feed formulations may and usually do contain moisture and may be in a substantially liquefied form. The feed formulations of the present invention containing the intake control agent for controlling feed intake are distinguishable from feed supplements containing a nitrogen source. Feed supplements containing a nitrogen source, such as urea, are used as a supplement to balance diet feed formulations for various animals. Due to the nature of the metabolism of some animals, the nitrogen source may be used to provide a portion of the protein requirement of the animal. However, the nitrogen source of such feed supplements is usually non-palatable to the animal and it must be mixed with a sweet carbohydrate source, usually molasses, to provide a feed supplement which will be ingested in any amount by the animal. Thus, the problem with feed supplements containing a nitrogen source, such as urea, is to induce increased consumption by the animal. The presence of intake control agents is not desirable and would defeat the purpose of inducing increased feed supplement consumption.

The intake control agent is present in the feed formulations at a level of from about 1 to about 12 percent by weight, dry solids basis, of the finished feed formulation in excess of total weight of monovalent cations. However, a feed concentrate intended for use in combination with other feed components and containing the intake control agent and other minerals, vitamins or partial feed formulation components can be prepared. The level of the intake control agent in such feed concentrates would, of course, depend upon the type of feed concentrate which is prepared. However, so long as the intake control agent is present in the concentrate at a level sufficient to provide from about 1 percent to about 12 percent by weight of the agent in excess of the total weight of monovalent cation in the finished feed formulation, the concentrate is satisfactory to provide the benefits of the present invention in limiting feed intake of domestic animals and poultry.

In a preferred embodiment of the present invention, calcium chloride salt is used in the feed formulations in combination with phosphate salts. It has been determined that a particularly desirable feed formulation is obtained when the calcium to phosphorus ratio is from about 1:1 to about 1.5:1. When calcium chloride is used to provide the chloride ion intake control agent, it is preferred to use phosphate salts other than calcium phosphate salts. A particularly preferred phosphate salt for use with calcium chloride is monoammonium phosphate. It should be understood, however, that the presence of phosphate salts is not required to obtain the benefits of the present invention in respect to controlling the feed intake of domestic animals and swine.

The following examples provide further illustrations of the present invention but are intended to in no way limit the scope of the invention which is defined in the appended claims.

EXAMPLE I

Very generally, feed formulations useful for swine include the following components at the indicated range of use:

| INGREDIENT | PERCENT |
|---|---|
| Grain products and processed grain by-products | 60.0–90.0 |
| Plant protein products | 7.5–20.0 |
| Animal protien products | 0.0–10.0 |
| Fat | 0.0–5.0 |
| Molasses | 0.0–6.0 |
| Vitamin Premix (may include all or part of: Vitamins A, D, E, K, Riboflavin Niacin, Choline, Pantothenic acid, Vitamin $B_{12}$, Biotin and Pyridoxine) | 0.05–0.25 |
| Trace mineral premix (may include all or part of: Iron, Copper, zinc, cobalt, iodine magnesium, manganese and potassium) | 0.025–0.075 |
| Major minerals (Sodium chloride, calcium carbonate and a phosphorus source) | 0.35–6.0 |

A feed formulation for swine in accordance with the present invention was prepared. The feed formulation contained calcium chloride to provide the chloride ion intake control agent and had the following ingredients at the indicated levels.

| INGREDIENT | PERCENT |
|---|---|
| Midds | 50.75 |
| Soy bean meal | 8.0 |
| Calcium chloride | 3.75 |
| Monoammonium phosphate | 3.5 |
| Ground corn | 20.6 |
| Dehydrated alfalfa meal | 5.0 |
| Vitamin premix | 0.15 |
| Trace mineral premix | 0.05 |
| Lignosulfonate | 1.75 |
| Salt | 0.4 |
| Molasses | 6.0 |
| Monocalcium phosphate | 0.035 |
| Dicalcium phosphate | 0.015 |

The above described feed formulation was fed to an experimental lot of 26 sows which were pregnant with their second litters. The sows were permitted to eat as much of the feed formulations as they desired and feed consumption was measured daily. The feed consumption for the sows averaged 3.2 pounds of feed per sow per day.

When a similar feed formulation in which ground corn replaced the calcium chloride and monoammonium phosphate was fed to a control lot of 26 second litter sows on a self-fed basis, the feed consumption averaged 11.9 pounds of feed per sow per day.

When a similar feed formulation containing calcium chloride at a level of 2.62 percent by weight and sodium sulphate at a level of 2.5 percent by weight was fed to a control lot of 26 second litter sows on a self-fed basis, the feed consumption averaged 12.3 pounds of feed per sow per day.

The feed consumption of the pregnant female swine is dependent, to some extent, upon the number of pregnancies that the female swine has undergone. For this reason, the control test was administered to swine which had undergone the same number of pregnancies as the experimental lot of swine.

EXAMPLE II

A number of feed formulations generally similar to that described in Example I were prepared in which the level of calcium chloride was varied from 2.5% to 7% by weight retaining the ratio of calcium to phosphorus of Example I. The ground corn in the ration was adjusted up or down as the calcium chloride and monoammonium phosphate level was decreased or increased. All feeds were supplied to sows or gilts on a self-feeding basis.

| Calcium Chloride % | Animals Fed | Average feed intake in pounds per day |
|---|---|---|
| 2.5 | 26-second litter sows | 5.6 |
| 2.5 | 15-second litter sows | 5.7 |
| 3.125 | 25-second litter sows | 4.25 |
| 3.75 | 15-second litter sows | 3.5 |
| 7.0 | 10-first litter sows (gilts) | 0.7 |

The feed intake decreased as the level of calcium chloride increased. At the 7.0% level of calcium chloride feed, intake was extremely limited and feeding of this formulation was halted at an early stage to prevent harm to the sows.

EXAMPLE III

A feed formulation generally similar to that described in Example I was prepared with the exception that 2.5 percent by weight of ammonium chloride was used in the feed formulation in place of the calcium chloride and ground corn replaced the monoammonium phosphate. This feed formulation was fed to fourth litter sows on a self-feeding basis. The feed consumption averaged 6.6 pounds of feed per sow per day. When the same formulation without the ammonium chloride was fed to fourth litter sows, the feed consumption averaged 10.7 pounds of feed per sow per day.

EXAMPLE IV

A feed formulation generally similar to that described in Example I was prepared wherein aluminum chloride was substituted for calcium chloride. The aluminum chloride was present at a level of 2.5 percent. When this feed formulation was fed to fourth litter sows on a self-feeding basis, the feed consumption averaged 6.23 pounds of feed per sow per day.

EXAMPLE V

A further feed formulation generally similar to that described in Example I was prepared wherein potassium chloride was substituted for calcium chloride at a level of 2.5 percent. When this feed formulation was fed to fourth litter sows on a self-feed basis, the feed consumption averaged 11.6 pounds of feed per sow per day, illustrating that potassium chloride is not effective as an intake control agent.

EXAMPLE VI

A further feed formulation generally similar to that described in Example I was prepared wherein Glauber's salt, (sodium sulfate containing 10 molecules of water of hydration) was substituted for calcium chloride and monoammonium phosphate at a level of 5.0%. When this feed formulation was fed to second litter sows on a self-fed basis the feed consumption averaged 9.5 pounds of food per sow per day. After four days the feeding was discontinued because of scouring.

Similar experiments with aluminum sulfate, ammonium sulfate, ammonium phosphate and calcium sulfate indicate that these compounds are also ineffective as intake control agents for swine. However, as seen in the following example, the combination of calcium sulfate and calcium chloride is effective and gives improved results over the use of calcium chloride alone.

EXAMPLE VII

A further feed formulation generally similar to that described in Example I was prepared containing 3.125% of calcium chloride, 2.0% of calcium sulfate and 4.35% ammonium phosphate with a reduction in the level of ground corn to compensate for the added components. When the feed formulation was self-fed to sows the feed consumption averaged 2.9 pounds per sow per day.

EXAMPLE VIII

A feed concentrate was prepared containing calcium chloride to provide the chloride ion intake control agent and had the following composition:

| INGREDIENT | PERCENT |
| --- | --- |
| 50% Protein content soybean meal | 59.00 |
| Biofos, (a phosphate source consisting of 70% of monocalcium phosphate and 30% of dicalcium phosphate) | 20.00 |
| Calcium chloride | 13.60 |
| Dehydrated alfalfa meal | 5.00 |
| Vitamin Premix | 0.60 |
| Trace Mineral Premix | 0.20 |
| Salt | 1.60 |

One part concentrate was mixed with three parts of ground corn to provide a finished feed formulation containing 14.1% of protein. The finished feed contained 3.4% calcium chloride and was effective in regulating feed intake of self-fed sows.

EXAMPLE IX

Certain domestic animals, such as cattle, sheep and horses, still derive a large portion of their feed throughout the year by grazing. In the spring and early summer, most grazing land provides grass which is adequate to meet the nutritional requirement of such grazing animals and no supplemental feed is required. However, as the grass matures during the late summer and fall, it decreases in protein concentration and energy value and feed formulations containing protein must be provided. In the winter, the grazing animals are fed dried grasses which also lack sufficient protein and energy values and a supplemental feed formulation is required.

Numerous situations exist in which it would be advantageous to utilize a combination of grazing and feed formulations containing protein. It would be desirable for the grazing animal to consume enough of the feed formulation to provide nutrients but over consumption would be uneconomical. Grazing animals would normally consume more of the feed formulation than would be economically feasible if allowed to eat all they want from a self-feeder and self-feeding is highly desirable because of the labor saving advantage.

Feed formulations containing multivalent cation chloride salts and ammonium chloride in accordance with the invention were prepared. Other feed supplements were prepared which contained other chloride salts which are not effective as feed intake control agents. The formulation for the feed supplements is set forth below in Table I.

| Ingredient | FEED FORMULATION NO. | | | | | | |
| --- | --- | --- | --- | --- | --- | --- | --- |
| | 1 | 2 | 3 | 4 | 5 | 6 | 7 |
| Ground Corn | 38.50 | | | | | | |
| Midds | 20.00 | | | | | | |
| Corn cobs | 20.00 | | | | | | |
| Soy flour | 11.60 | | | | | | |
| Fat | 0.20 | | | SAME AS NO. 1 | | | |
| Biofos | 3.00 | | | | | | |
| Trace mineral premix | .70 | | | | | | |
| Calcium chloride | 6.00 | — | — | — | — | — | — |
| Sodium chloride | — | 6.00 | — | — | — | — | — |
| Potassium chloride | — | — | 6.00 | — | — | — | — |
| Magnesium chloride | — | — | — | 6.00 | — | — | — |
| Ammonium chloride | — | — | — | — | 6.00 | — | — |
| Ferric chloride | — | — | — | — | — | 6.00 | — |
| Aluminum chloride | — | — | — | — | — | — | 6.00 |

Each of the feed formulations described above in Table I were pelleted and were offered to cattle on a free choice basis. Cattle also had access to hay on a free choice basis. The feed intake of the pelleted feed formulations and of hay of separate groups of cattle were determined over a 4 week period. The average feed intake of each group of cattle of the feed formulation and of hay over the four week period was determined and is set forth hereinbelow in Table II.

TABLE II

| Chloride Salt | Feed Formulation No. | | | | | | |
|---|---|---|---|---|---|---|---|
| | 1 Calcium Chloride | 2 Sodium Chloride | 3 Potassium Chloride | 4 Magnesium Chloride | 5 Ammonium Chloride | 6 Ferric Chloride | 7 Aluminum Chloride |
| Pellets-lbs. | 5.54 | 13.81 | 13.34 | 8.04 | 3.74 | 0.65 | 2.31 |
| Hay-lbs. | 9.83 | 5.67 | 5.59 | 9.46 | 11.22 | 12.84 | 13.11 |
| Total-lbs. | 15.37 | 19.48 | 18.93 | 17.50 | 14.96 | 13.48 | 15.42 |
| lb. of total Feed/lb. gain | 22.28 | 14.01 | 13.82 | 16.67 | 17.81 | 21.06 | 14.69 |
| lb. of pellets/lb. gain | 8.03 | 9.94 | 9.74 | 7.66 | 4.45 | 1.02 | 2.20 |

From the foregoing results as reported in Table II, it can be seen that the particular chloride salts of the present invention are effective to restrict the intake of the pelleted protein feed supplement. Ferric chloride is particularly effective and is followed closely in effectiveness by aluminum chloride and ammonium chloride. Calcium chloride is also effective. Magnesium chloride has less effectiveness than calcium chloride but is also considered to be suitable for use to provide the chloride ion feed intake control agent. It can be seen that sodium chloride and potassium chloride are totally ineffective to restrict feed intake of the pelleted protein feed formulation by the cattle.

EXAMPLE X

The following feed formulations were prepared and were offered to four groups of lambs on a free choice basis.

TABLE III

| Feed Formulation No. | | | | |
|---|---|---|---|---|
| Ingredient: | | | | |
| Midds | 60.00 | 60.00 | 60.00 | 60.00 |
| Corn cobs | 20.00 | 20.00 | 20.00 | 20.00 |
| Corn | 10.00 | 10.00 | 5.00 | — |
| Soybean Meal | 3.00 | 3.00 | 4.00 | 4.50 |
| Fat | 2.00 | 2.00 | 2.00 | 2.00 |
| Salt | 0.40 | 0.40 | 0.40 | 0.40 |
| Biofos | 1.00 | 1.00 | 2.00 | 3.50 |
| Trace Mineral Premix | 0.60 | 0.60 | 0.60 | 0.60 |
| Calcium chloride | — | 3.00 | 6.00 | 9.00 |
| Limestone (39% Ca) | 3.00 | — | — | — |
| | 100.00 | 100.00 | 100.00 | 100.00 |

The lambs also had access to chopped alfalfa on a free choice basis. The feed formulations containing calcium chloride were effective to reduce the intake of the feed formulation and to cause the lambs to consume a greater portion of chopped alfalfa than the group of lambs which were offered the control feed formulation containing no calcium chloride.

EXAMPLE XI

The following feed formulations were prepared and were offered to broiler breeder pullets. The pullets were twelve weeks old and the feed formulations were offered to the pullets on a free choice basis.

TABLE IV

| Feed Formulation No. | 11 | 12 | 13 | 14 |
|---|---|---|---|---|
| Ingredient: | | | | |
| Corn Med. ground | 66.77 | 65.87 | 65.37 | 63.77 |
| Midds | 3.50 | 3.50 | 3.50 | 3.50 |

TABLE IV-continued

| Feed Formulation No. | 11 | 12 | 13 | 14 |
|---|---|---|---|---|
| Ingredient: | | | | |
| Meat scrap | 1.70 | 1.70 | 1.70 | 1.70 |
| Soybean meal | 17.75 | 17.75 | 17.75 | 17.75 |
| Salt | 0.30 | 0.30 | 0.30 | 0.30 |
| Limestone (39% Ca) | 4.40 | 3.30 | 2.80 | 4.40 |
| Oyster shells | 4.00 | 3.00 | 2.00 | 4.00 |
| Vitamin-mineral premix | 1.63 | 1.63 | 1.63 | 1.63 |
| Calcium chloride | — | 3.00 | 5.00 | 3.00 |
| | 100.00 | 100.00 | 100.00 | 100.00 |

Each of the feed formulations containing calcium chloride as an added ingredient were effective to restrict the feed intake of the pullets as compared to the feed intake of that group of pullets which were offered the control ration No. 11 containing no calcium chloride.

From the above description it can be seen that the chloride ion feed intake control agent of the present invention, which is provided by particular chloride salts alone or in combination, are very effective in limiting the feed intake of domestic animals and poultry. It is also apparent that it is necessary to use the particular chloride salts of the invention to provide the chloride ion intake control agent. Other salts, including sodium chloride, and potassium chloride, are not effective to provide the benefits of the present invention in respect to feed intake control of domestic animals and poultry.

What is claimed is:

1. A complete feed formulation for domestic animals and poultry which reduces the feed intake when offered on a self-feeding basis, which feed formulation at the time of feeding comprises an admixture of feed nutrient materials and a feed intake control agent, said agent being chloride ion which is present in said feed formulation at a level of from about 1 percent to about 12 percent by weight in excess of the total level of monovalent cations other than ammonium and hydrogen which are present in said feed formulation.

2. A feed formulation in accordance with claim 1 wherein said agent is present in said feed formulation at a level of from about 1 percent to about 6 percent by weight of the feed formulation in excess of the total level of monovalent cations other than ammonium and hydrogen.

3. A feed formulation in accordance with claim 1 wherein said agent is provided from the group consisting of multivalent chloride salts and ammonium chloride.

4. A feed formulation in accordance with claim 3 wherein said multivalent chloride salts are selected from the group consisting of calcium chloride, aluminum chloride, ferric chloride, magnesium chloride and mixtures thereof.

5. A feed formulation in accordance with claim 1 wherein said agent is provided by calcium chloride.

6. A feed formulation in accordance with claim 1 wherein said agent is provided by ammonium chloride.

7. A feed formulation in accordance with claim 1 wherein said agent is provided by aluminum chloride.

8. A feed formulation in accordance with claim 1 wherein said agent is provided by ferric chloride.

9. A feed formulation in accordance with claim 1 wherein said agent is provided by magnesium chloride.

10. A method for controlling the feed intake of domestic animals and poultry which comprises preparing a complete feed formulation for domestic animals and poultry, said feed formulation at the time of feeding comprising an admixture of feed nutrient materials and a feed intake control agent, said agent being chloride ion which is present in said feed formulation at a level of from about 1 percent to about 12 percent by weight in excess of the total level of monovalent cations other than ammonium and hydrogen which are present in said feed formulation, and offering said feed formulation to said domestic animals and poultry on a self-feeding basis.

11. A method in accordance with claim 10 wherein said agent is present in said feed formulation at a level of from about 1 percent to about 6 percent by weight of the feed formulation in excess of the total level of monovalent cations other than ammonium and hydrogen.

12. A method in accordance with claim 10 wherein said agent is provided from the group consisting of multivalent chloride salts and ammonium chloride.

13. A method in accordance with claim 10 wherein said multivalent chloride salts are selected from the group consisting of calcium chloride, aluminum chloride, ferric chloride, magnesium chloride and mixtures thereof.

14. A method in accordance with claim 10 wherein said agent is provided by calcium chloride.

15. A method in accordance with claim 10 wherein said agent is provided by ammonium chloride.

16. A method in accordance with claim 10 wherein said agent is provided by aluminum chloride.

17. A method in accordance with claim 10 wherein said agent is provided by ferric chloride.

18. A method in accordance with claim 10 wherein said agent is provided by magnesium chloride.

19. A complete feed formulation for domestic animals and poultry which reduces the feed intake when offered on a self-feeding basis, which feed formulation at the time of feeding comprises an admixture of feed nutrient materials and a feed intake control agent, said agent being chloride ion which is present in said feed formulation in an amount of from about 0.25 percent to about 1 percent by weight in excess of the total amount of monovalent cations other than ammonium and hydrogen which are present in said feed formulation.

20. A method for controlling the feed intake of domestic animals and poultry which comprises preparing a complete feed formulation for domestic animals and poultry, said feed formulation at the time of feeding comprising an admixture of feed nutrient materials and a feed intake control agent, said agent being chloride ion which is present in said feed formulation at a level of from about 0.25 percent to about 1 percent by weight in excess of the total level of monovalent cations other than ammonium and hydrogen which are present in said feed formulation, and offering said feed formulation to said domestic animals and poultry on a self-feeding basis.

* * * * *

REEXAMINATION CERTIFICATE (66th)

United States Patent [19]
McNeff

[11] B1 4,182,755
[45] Certificate Issued Mar. 29, 1983

[54] FEED INTAKE CONTROL OF ANIMALS

[75] Inventor: Larry C. McNeff, Wayzata, Minn.

[73] Assignee: Cargill Inc., Minneapolis, Minn.

Reexamination Request
No. 90/000,088, Oct. 15, 1981

Reexamination Certificate for:
Patent No.: 4,182,755
Issued: Jan. 8, 1980
Appl. No.: 663,437
Filed: Mar. 3, 1976

Related U.S. Application Data

[63] Continuation-in-part of Ser. No. 532,741, Dec. 18, 1974, abandoned, which is a continuation-in-part of Ser. No. 430,676, Jan. 4, 1974, abandoned.

[51] Int. Cl.$^3$ .............................................. A61K 33/26
[52] U.S. Cl. ... 424/147; 424/153; 424/154; 424/166; 426/807
[58] Field of Search .......... 424/153, 154, 424/147, 166

[56] References Cited

OTHER PUBLICATIONS

Advertisement for "SOW-MATIC Feed", published 1974 by Cargill Nutrena Feed Division, Minneapolis, Minn.

Ely et al., Chem. Abst., vol. 77 (1972), p. 99996d.

Ely et al., Can. J. Anim. Sci., vol. 55, pp. 337-342 (1972).

Crookshank et al., J. Anim. Sci., vol. 36, no. 6, pp. 1007-1009 (1973).

Bushman, et al., Chem. Abst., vol. 67 (1967), p. 11475a.

Bushman, et al., J. Animal Sci., vol. 26, no. 5. pp. 1199-1204 (1967).

Melliere, et al, J. Nutrition, vol. 90, no. 3, pp. 310-314 (1966).

Nescheim, et al., J. Nutrition, vol. 84, pp. 361-366 (1964).

The Merck Index, 1960, 7th ed., Merck & Co., Inc., Rahway, N.J., pp. 98-99 (Arginine), 253 (Choline chloride), 521 (Histidine), 623 (Lysine), 842 (Potassium Iodide), 844 (Potassium Phosphate, Monobasic), 946 (Sodium Bicarbonate), 948 (Sodium Chloride).

The American Heritage Dictionary of the English Language (1976) pp. 389, 1026.

Journess de Recherches Aviocoles et Cunicoles, Dec. 1973, pp. 187-192 with translation.

Poultry Science, vol. 44, pp. 803-808.

*Primary Examiner*—Sam Rosen

[57] ABSTRACT

Feed compositions for self-feeding animals including a chloride ion intake control agent. The chloride ion is provided from a salt selected from calcium chloride, ammonium chloride, aluminum chloride, ferric chloride, magnesium chloride and mixtures thereof.

REEXAMINATION CERTIFICATE ISSUED UNDER 35 U.S.C. 307.

THE PATENT IS HEREBY AMENDED AS INDICATED BELOW.

Matter enclosed in heavy brackets appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 1, lines 9–29.

The present invention relates generally to feed compositions for domestic animals [and poultry] and to a method for controlling the feed intake of animals [and poultry]. More particularly, the present invention is directed to feed compositions which permit controlled feed intake of self-fed domestic animals [and poultry] and to a method for controlling the feed intake of domestic animals [and poultry] when feed is offered to the animal on a free choice basis.

It is often desirable to offer feed to animals on a free choice basis without periodic feedings of a rationed amount each day. A disadvantage of feeding animals on a free choice basis is that most animals, particularly swine, cattle, horses, [poultry] and domestic pets tend to over-eat and consequently take in a higher level of feed than is necessary for desired weight gain or weight maintenance. This results in the provision of unnecessary amounts of feed which is an additional expense and is often deterimental to the health of the animals. It is desirable to limit the intake of the feed when the animal is offered the feed on a free choice basis.

Column 2, lines 22–44.

It would be desirable to provide feed compositions which may be fed to animals [and poultry] on a free choice basis but which the animal would eat only in an anount required for efficient weight gain or for weight maintenance. As indicated above, it has been proposed to use sodium chloride as an intake control agent in swine feed. However, the use of sodium chloride at levels as high as 10 percent of a swine feed formulation does not result in appreciably reduced feed intake. Moreover, the use of such high levels of sodium chloride results in excessive water consumption by the swine during feeding and may result in tongue lesions.

Accordingly, it is a principal object of the present invention to provide feed compositions for domestic animals [and poultry] which results in the limiting of intake of the feed composition on a self-fed basis to an amount which is needed for weight gain or weight maintenance without consumption of more than is needed by the animal [or fowl].

It is another object of the present invention to provide a feed composition for domestic animals [and poultry] which is highly effective in limiting feed intake to a desired amount.

Column 2, lines 51–68.

Generally, in accordance with the present invention, a self-feeding ration for domestic animals [and poultry] contining a feed intake control agent is provided. For purposes of the present invention, the term "domestic animals" includes [all of that group of animals which have been domesticated and which rely upon man for all or a portion of their feed. Included in this group are] ateriodactyl animals, such as swine, sheep and cattle; solid hoofed animals, such as horses; and domestic pets, such as dogs and cats. The term includes both monogastric and ruminant animals. [By the term "poultry" is meant all domestic fowl, such as chickens, turkeys, ducks, geese and guinea hens.] The feed intake control agent is included in the feed ration at a level effective to suppress the intake of the feed ration by the animal [or fowl] to an amount suitable for desired weight gain or weight maintenance without overeating when the feed ration is offered to the animal on a free choice basis.

Column 3, lines 31–66.

The ability of chloride ion in excess of monovalent cations to function as an intake control agent to control the intake of self-fed amimals [and poultry] is totally surprising. Attempts have been made to use high levels of sodium chloride to limit the feed intake of swine and cattle. It has been reported that the use of sodium chloride at a level of 10 percent of the total feed ration was not effective to limit feed intake of swine when the feed was offered to the swine on a free choice basis.

For most domestic animals [and poultry], the chloride ion intake control agent of the present invention is preferably used at a level in the range of from about 1 percent to about 6 percent by weight of the feed ratio in excess of the total level of monovalent cation by weight of the feed ration. At the preferred level of chloride ion use of from about 1 to about 6 percent the feed intake of most domestic animals is reduced by from about 20 percent to about 80 percent when the animals are fed on a free choice basis. For some domestic animals, such as cattle and horses, the intake control agent may be used at higher levels of up to about 12 percent by weight to attain a feed reduction of up to about 80 percent. It should be understood that chloride ion can be used at levels of less than 1 percent in excess of the total level of monovalent cation for some purposes. For example, use of chloride ion in the range of from about 0.25 to about 1.0 percent by weight in excess of the total level of monovalent cation ion is effective in some cases to reduce feed intake by from about 5 to about 20 percent. Such levels of limited feed reduction are desirable for some purposes, such as "finishing" of cattle in feed lots. It should also be understood that the levels of use of the intake control agent refer to the chloride ion level without consideration of the multivalent cation level, ammonium ion level or the water of hydration or equilibrium moisture of the chloride salts.

Column 4, lines 12–65.

The intake control agent effectively limits the feed consumption of domestic animals [and poultry] and provides a feed ration which can be administered on a self-feeding basis. As previously indicated, the problem of self-feeding of swine is particularly acute for pregnant female swine and the intake control agents of the present invention are particularly suitable for use in feed rations for pregnant female swine.

It should be understood that the feed formulations of the present invention are balanced diet feed formulations which are suitable for providing a complete feed ration for domestic animals [and poultry]. The levels of use of the intake control agent of the invention are based on the total weight of the components of such balanced diet feed formulations on a dry solids basis. However, the feed formulations may and usually do contain moisture and may be in a substantially liquefied form. The feed formulations of the present invention containing the intake control agent for controlling feed intake are distinguishable from feed supplements containing a nitrogen source. Feed supplements containing a nitrogen source, such as urea, are used as a supplement to balance diet feed formulations for various animals. Due to the nature of the metabolism of some animals, the nitrogen source may be used to provide a portion of the protein requirement of the animal. However, the nitrogen source of such feed supplements is usually non-palatable to the animal and it must be mixed with a sweet carbohydrate source, usually molasses, to provide a feed supplement which will be ingested in any amount by the animal. Thus, the problem with feed supplements containing a nitrogen source, such as urea, is to induce increased consumption by the animal. The presence of intake control agents is not desirable and would defeat the purpose of inducing increased feed supplement consumption.

The intake control agent is present in the feed formulations at a level of from about 1 to about 12 percent by weight, dry solids basis, of the finished feed formulation in excess of total weight of monovalent cations. However, a feed concentrate intended for use in combination with other feed components and containing the intake control agent and other minerals, vitamins or partial feed formulation components can be prepared. The level of the intake control agent in such feed concentrates would, of course, depend upon the type of feed concentrate which is prepared. However, so long as the intake control agent is present in the concentrate at a level suffcent to provide from about 1 percent to about 12 percent by weight of the agent in excess of the total weight of monovalent cation in the finished feed formulation, the concentrate is satisfactory to provide the benefits of the present invention in limiting feed intake of domestic animals [and poultry].

Column 9, line 57-column 10, line 44.

[EXAMPLE XI]

[The following feed formulations were prepared and were offered to broiler breeder pullets. The pullets were twelve weeks old and the feed formulations were offered to the pullets on a free choice basis.

TABLE IV

| Feed Formulation No. | 11 | 12 | 13 | 14 |
|---|---|---|---|---|
| Ingredient |  |  |  |  |
| Corn Med. ground | 66.77 | 65.87 | 65.37 | 63.77 |
| Midds | 3.50 | 3.50 | 3.50 | 3.50 |
| Meat scrap | 1.70 | 1.70 | 1.70 | 1.70 |
| Soybean meal | 17.75 | 17.75 | 17.75 | 17.75 |
| Salt | 0.30 | 0.30 | 0.30 | 0.30 |
| Limestone (39% Ca) | 4.40 | 3.30 | 2.80 | 4.40 |
| Oyster shells | 4.00 | 3.00 | 2.00 | 4.00 |
| Vitamin-mineral premix | 1.63 | 1.63 | 1.63 | 1.63 |
| Calcium chloride | — | 3.00 | 5.00 | 3.00 |
|  | 100.00 | 100.00 | 100.00 | 100.00 |

Each of the feed formulations containing calcium chloride as an added ingredient were effective to restrict the feed intake of the pullets as compared to the feed intake of that group of pullets which were offered the control ration No. 11 containing no calcium chloride.]

From the above description it can be seen that the chloride ion feed intake control agent of the present invention, which is provided by particular chloride salts alone or in combination, are very effective in limiting the feed intake of domestic animals [and poultry]. It is also apparent that it is necessary to use the particular chloride salts of the invention to provide the chloride ion intake control agent. Other salts, including sodium chloride, and potassium chloride, are not effective to provide the benefits of the present invention in respect to feed intake control of domestic animals [and poultry].

AS A RESULT OF REEXAMINATION, IT HAS BEEN DETERMINED THAT:

Claims 1-9 and 19, having been finally determined to be unpatentable, are cancelled.

Claims 10 and 20 are determined to be patentable as amended:

10. A method for controlling the feed intake of domestic animals *other than* [and] poultry *that have a tendency to consume a higher level of feed than is necessary or desired*, which *method* comprises preparing a complete feed formulation [for domestic animals and poultry], said feed formulation at the time of feeding comprising an admixture of feed nutrient materials and a feed intake control agent, said agent being chloride ion which is present in said feed formulation at a level of from about 1 percent to about 12 percent by weight in excess of the total level of monovalent cations other than ammonium and hydrogen which are present in said feed formulation, and offering said feed formulation to said domestic animals [and poultry] on a self-feeding basis.

Claims 11-18, dependent on amended claims, are determined to be patentable.

20. A method for controlling the feed intake of domestic animals *other than* [and] poultry *that have a tendency to consume a higher level of feed than is necessary or desired*, which *method* comprises preparing a complete feed formulation [for domestic animals and poultry], said feed formulation at the time of feeding comprising an admixture of feed nutrient materials and a feed intake control agent, said agent being chloride ion which is present in said feed formulation at a level of from about 0.25 percent to about 1 percent by weight in excess of the total level of monovalent cations other than ammonium and hydrogen which are present in said feed formulation, and offering said feed formulation to said domestic animals [and poultry] on a self-feeding basis.

New claim 21 is added and determined to be patentable.

*21. A method in accordance with claim 10 wherein the domestic animals are swine.*

* * * * *